Sept. 5, 1950     J. K. STANLAND     2,521,191
PORTABLE HOIST
Filed March 25, 1949
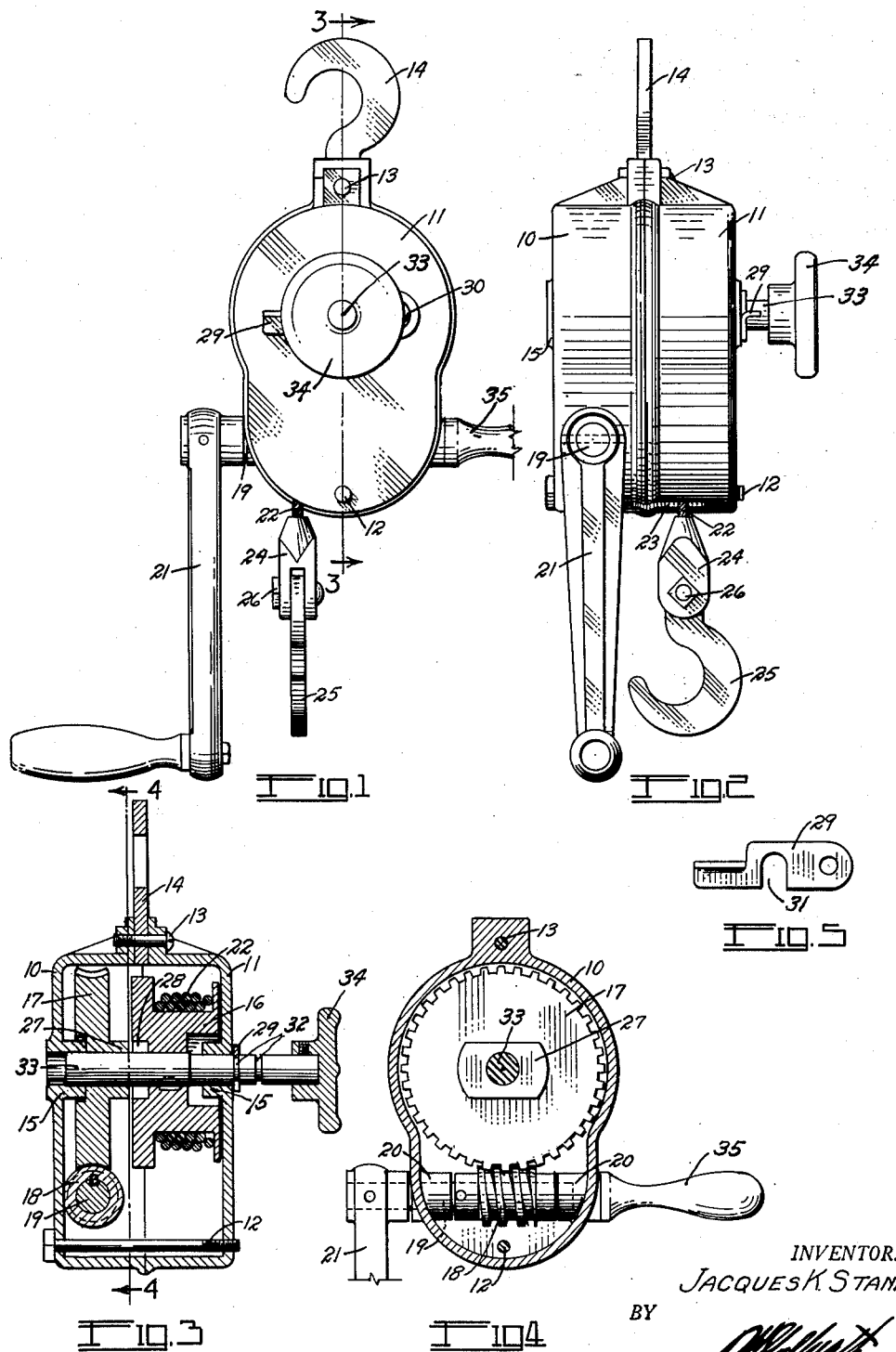
INVENTOR.
JACQUES K STANLAND
BY
ATTORNEY Patented Sept. 5, 1950

2,521,191

UNITED STATES PATENT OFFICE 2,521,191

PORTABLE HOIST

Jacques K. Stanland, Denver, Colo.

Application March 25, 1949, Serial No. 83,461

3 Claims. (Cl. 254—170)

This invention relates to a portable hoist or pulling jack, more particularly designed as a convenient tool for use in tightening fence wire and other lifting and pulling jobs. It is so designed that it may be conveniently carried in an automotive vehicle for pulling the vehicle from ditches, mud holes, and the like.

The principal object of the invention is to design a simple, light-weight, compact unit which can be operated with minimum effort to exert a maximum pulling effort.

Another object is to so construct the device that any slack in the pulling member can be quickly and easily taken up before the maximum pulling action is exerted.

A further object is to so construct the device that the pulling mechanism may be easily disconnected to allow the pulling member to be quickly pulled to any desired extended position.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a front view of the improved pulling jack;

Fig. 2 is a side view thereof;

Fig. 3 is a vertical section, taken on the line 3—3, Fig. 1;

Fig. 4 is a vertical section, taken on the line 4—4, Fig. 3; and

Fig. 5 is a front view of a latch.

The improved pulling jack is mounted in an enclosing housing consisting of a cup-like front housing section 10 and a cup-like rear housing section 11. The two sections are clamped together by means of a lower clamp bolt 12 and an upper clamp screw 13. The upper clamp screw 13 also serves to secure a suspension hook 14 in place between the two sections of the housing.

A reel shaft 33 extends through the housing sections 10 and 11, it being mounted in suitable bearings 15 in the latter. The reel shaft is arranged for both rotative and longitudinal movement in its bearings.

A cable reel 16 is fixed on the reel shaft 33 within the housing section 11 so that it will move as a unit therewith. A worm wheel 17 is rotatably mounted on the reel shaft 33 within the housing 10.

The worm wheel is rotated from a worm 18 fixed on a worm shaft 19 extending longitudinally through the lower portion of the housing section 10 and journalled in suitable bearings 20 therein.

The worm shaft terminates on the exterior of the housing in a hand crank 21 which is fixedly secured thereto. The reel 16 has a grooved periphery for receiving a flexible pulling cable 22. The cable extends through a slot 23 in the bottom of the housing 11 and terminates in a cable clevis 24. A pulling hook 25 is mounted in the clevis 24 upon a clevis pin 26.

The inner face of the worm gear 17 is formed with an elongated clutch dog 27 projecting therefrom. The inner face of the reel 16 contains an identical clutch dog socket 28 of a contour to snugly receive the clutch dog 27 when the reel shaft 33 is forced inwardly into the housing. The clutch dog 27 may be released from the reel 16 by moving the reel shaft 33 outwardly in the housing, as shown in Fig. 3. The cylindrical surface of the worm 18 projects into an annular, semi-cylindrical socket in the worm wheel, as is usual in worm gear construction. Thus, the worm wheel 17 is held in alignment with the worm 18 and is prevented from moving with the longitudinal movement of the shaft 33.

The shaft 33 may be locked in either the engaged or disengaged positions by means of a swinging latch member 29, shown in detail in Fig. 5. The latch member 29 is pivoted upon the face of the back housing section 11 upon a suitable pivot rivet 30 and is provided with a side notch 31 which can be engaged in either of two locking notches 32 to retain the reel 16 engaged with, or disengaged from, the dog 27.

A hand knob 34 is mounted on the projecting extremity of the shaft 33 to facilitate manual rotation and shifting of the shaft. A handle 35 is fixedly mounted on the housing section 10 so as to project in substantial alignment with the worm shaft 19 from the opposite side of the housing.

In use, the hook 14 is secured to any suitable fixed support. The shaft 33 is shifted outwardly to release the dog 27 and the cable 22 is drawn from the housing sufficiently to allow the hook 25 to engage the article to be lifted or pulled. The knob 34 is now rotated to take up any slack in the cable 22, and the shaft 33 is forced inwardly to engage the dog socket 28 over the dog 27, and the latch 29 is engaged in the outer groove 32 to lock the dog in engagement. The crank 21 is now rotated to wind the cable 22 about the reel 16 to exert the maximum pulling effort of the jack.

When the jack is no longer needed, the dog 27 is released and the cable is rapidly wound upon the reel by simple manual rotation of the knob 34.

While a specific form of the improvements has been described and illustrated herein, it is to be understood that the same may be varied, within the scope of the appended claims, without departing from the spirit of the invention.

Having thus described the invention, what is claimed and desired secured by Letters Patent is:

1. A portable pulling jack comprising: two cup-like housing sections; means securing the open faces of said housing sections together to form a hollow enclosing housing; a supporting hook secured to said housing in the plane of the contacting faces of said housing sections; a reel shaft extending through said housing and projecting from one side thereof, said shaft being arranged for both rotative and longitudinal movement; a cable reel fixed to said reel shaft so as to move as a unit therewith; a cable reeled upon said reel and extending to the exterior of said housing; a worm wheel rotatively mounted on said reel shaft; a worm extending transversally of said reel shaft in mesh with said worm wheel; a worm shaft carrying said worm and extending to the exterior of said housing; a crank on the external extremity of said worm shaft for rotating the latter; a clutch dog projecting from the inner face of said worm wheel so as to be received in a dog socket in said reel to rotate the latter; and a knob on the projecting extremity of said reel shaft for rotating the latter and for shifting said reel shaft longitudinally to bring the dog and its socket into and out of engagement.

2. A portable pulling jack comprising: two cup-like housing sections; means securing the open faces of said housing sections together to form a hollow enclosing housing; a supporting hook secured to said housing in the plane of the contacting faces of said housing sections; a reel shaft extending through said housing and projecting from one side thereof, said shaft being arranged for both rotative and longitudinal movement; a cable reel fixed to said reel shaft so as to move as a unit therewith; a cable reeled upon said reel and extending to the exterior of said housing; a worm wheel rotatively mounted on said reel shaft; a worm extending transversally of said reel shaft in mesh with said worm wheel; a worm shaft carrying said worm and extending to the exterior of said housing; a crank on the external extremity of said worm shaft for rotating the latter; a clutch dog projecting from the inner face of said worm wheel so as to be received in a dog socket in said reel to rotate the latter; a knob on the projecting extremity of said reel shaft for rotating the latter and for shifing said reel shaft longitudinally to bring the dog and its socket into and out of engagement; a pair of circumferential grooves in said reel shaft spaced apart substantially the depth of said socket; and latch means on the exterior of said housing for selectively engaging said grooves to maintain said clutch dog either in or out of said socket.

3. A portable pulling jack comprising: two cup-like housing sections; means securing the open faces of said housing sections together to form a hollow enclosing housing; a supporting hook secured to said housing in the plane of the contacting faces of said housing sections; a reel shaft extending through said housing and projecting from one side thereof, said shaft being arranged for both rotative and longitudinal movement; a cable reel fixed to said reel shaft so as to move as a unit therewith; a cable reeled upon said reel and extending to the exterior of said housing; a worm wheel rotatively mounted on said reel shaft; a worm extending transversally of said reel shaft in mesh with said worm wheel; a worm shaft carrying said worm and extending to the exterior of said housing; a crank on the external extremity of said worm shaft for rotating the latter; a clutch dog projecting from the inner face of said worm wheel so as to be received in a dog socket in said reel to rotate the latter; a knob on the projecting extremity of said reel shaft for rotating the latter and for shifing said reel shaft longitudinally to bring the dog and its socket into and out of engagement; a pair of circumferential grooves in said reel shaft spaced apart substantially the depth of said socket; latch means on the exterior of said housing for selectively engaging said grooves to maintain said clutch dog either in or out of said socket; and a fixed handle projecting from said housing in substantial alignment with and oppositely from said worm shaft.

JACQUES K. STANLAND.

REFERENCES CITED

The following references are of record in the file of this patent:

UNITED STATES PATENTS

| Number | Name | Date |
|---|---|---|
| 116,613 | Marsden | July 4, 1871 |
| 1,506,865 | Robinson | Sept. 2, 1924 |
| 2,217,453 | Pennell | Oct. 8, 1940 |
| 2,270,271 | Coffing | Jan. 20, 1942 |